(12) United States Patent
Chen

(10) Patent No.: US 11,524,740 B2
(45) Date of Patent: Dec. 13, 2022

(54) TRANSPORTATION DEVICE HAVING MULTIPLE AXES OF ROTATION AND AUTO-BALANCE BASED DRIVE CONTROL

(71) Applicant: Shane Chen, Camas, WA (US)

(72) Inventor: Shane Chen, Camas, WA (US)

( * ) Notice: Subject to any disclaimer, the term of this patent is extended or adjusted under 35 U.S.C. 154(b) by 326 days.

(21) Appl. No.: 16/055,148

(22) Filed: Aug. 5, 2018

(65) Prior Publication Data

US 2019/0039675 A1 Feb. 7, 2019

Related U.S. Application Data

(60) Provisional application No. 62/541,658, filed on Aug. 5, 2017.

(51) Int. Cl.
| | | |
|---|---|---|
| *B62J 45/42* | (2020.01) | |
| *B62K 11/00* | (2006.01) | |
| *B62M 7/04* | (2006.01) | |
| *B62D 61/02* | (2006.01) | |
| *B62D 51/02* | (2006.01) | |
| *B62J 45/41* | (2020.01) | |
| *B62K 3/00* | (2006.01) | |
| *B62M 7/12* | (2006.01) | |
| *B62D 55/06* | (2006.01) | |

(52) U.S. Cl.
CPC .............. *B62J 45/42* (2020.02); *B62D 51/02* (2013.01); *B62D 61/02* (2013.01); *B62J 45/41* (2020.02); *B62K 3/002* (2013.01); *B62K 11/00* (2013.01); *B62M 7/04* (2013.01); *B62D 55/06* (2013.01); *B62K 2204/00* (2013.01); *B62M 7/12* (2013.01)

(58) Field of Classification Search
CPC ........ B62D 61/02; B62D 51/02; B62D 55/06; B62K 3/002; B62K 11/00; B62K 2202/00; B62K 2204/00; B62J 45/40; B62M 7/04; B62M 7/12
See application file for complete search history.

(56) References Cited

U.S. PATENT DOCUMENTS

| | | | | |
|---|---|---|---|---|
| 4,151,892 A * | 5/1979 | Francken | ............. | B62D 21/183 74/478 |
| 4,354,569 A * | 10/1982 | Eichholz | ................ | B62K 3/002 74/478 |
| 4,538,695 A * | 9/1985 | Bradt | ..................... | B62D 51/02 280/DIG. 5 |
| 5,819,865 A * | 10/1998 | Cowley | ................ | A63C 17/012 280/7.14 |
| 6,446,742 B1* | 9/2002 | Wilson | ................. | A61G 5/1091 180/908 |
| 6,543,564 B1 | 4/2003 | Kamen et al. | | |
| 7,293,622 B1* | 11/2007 | Spital | ..................... | A63C 17/12 180/181 |

(Continued)

*Primary Examiner* — Jacob B Meyer
*Assistant Examiner* — Maurice L Williams

(57) ABSTRACT

Various embodiments of transportation devices that have at least two axes of rotation and employ ride balance based drive control are disclosed. One embodiment is a scooter type device with a platform structure movable in fore-aft. The drive motor may be provided at the platform section or drive wheel or be otherwise located. Other embodiments include inline wheeled board embodiments. Yet other embodiments include those utilizing a continuous track. The continuous track embodiments may have two drive motors, among other features.

23 Claims, 5 Drawing Sheets

(56) References Cited

U.S. PATENT DOCUMENTS

| | | | |
|---|---|---|---|
| 9,004,213 B2* | 4/2015 | Larson | A63C 17/012 |
| | | | 180/181 |
| 9,114,849 B2* | 8/2015 | Choppla | B62M 1/36 |
| 9,499,228 B2* | 11/2016 | Chang | B62K 3/002 |
| 9,682,732 B2* | 6/2017 | Strack | B62D 51/02 |
| 10,035,557 B2* | 7/2018 | Chang | B62K 11/007 |
| 10,046,798 B2* | 8/2018 | Reeves | B62D 51/02 |
| 10,569,831 B2* | 2/2020 | Heber | B62J 45/41 |
| 2004/0055796 A1 | 3/2004 | Kamen et al. | |
| 2006/0202439 A1* | 9/2006 | Kahlert | B62K 11/007 |
| | | | 280/47.24 |
| 2010/0250040 A1* | 9/2010 | Yamano | B62K 11/007 |
| | | | 701/22 |
| 2017/0144718 A1* | 5/2017 | Tinaphong | B62K 11/007 |
| 2017/0151995 A1* | 6/2017 | Chen | B62K 23/08 |
| 2017/0174285 A1* | 6/2017 | Yu | B60L 15/2036 |
| 2017/0213477 A1* | 7/2017 | Honeycutt | G09B 19/167 |
| 2017/0259163 A1* | 9/2017 | Zhou | A63C 17/223 |
| 2017/0341690 A1* | 11/2017 | Pikulski | B62D 51/001 |
| 2019/0084364 A1* | 3/2019 | Lagrandcourt | B60G 17/0165 |
| 2021/0155227 A1* | 5/2021 | Chen | H02K 11/33 |

\* cited by examiner

TRANSPORTATION DEVICE HAVING MULTIPLE AXES OF ROTATION AND AUTO-BALANCE BASED DRIVE CONTROL

CROSS REFERENCE TO RELATED APPLICATIONS

This application claims the benefit of U.S. Provisional Application No. 62/541,658, filed Aug. 5, 2017, entitled Rider-Balancing Vehicle, and having the same inventor(s) as above.

FIELD OF THE INVENTION

The present invention relates to vehicles that use an auto-balancing system to control vehicle drive and, more specifically, to multi-wheel axis vehicles that employ auto-balancing.

BACKGROUND OF THE INVENTION

Various vehicles are known in the art that use auto-balancing and they include the Segwey, Solowheel and Hovertrak, taught in U.S. Pat. Nos. 6,302,230; 8,807,250; and 8,738,278, respectively, which are hereby incorporated by reference.

In these devices, there is generally one principal axis of rotation. The vehicle performs auto-balancing by speeding up or slowing down in an attempt to bring the platform surface of the vehicle to a steady-state balanced position.

The present invention provides a device with multiple axes of rotation, one forward of the other, such as a front wheel and a rear wheel. A movable rider platform with an associated position sensor permits a user to control the vehicle by leaning forward or rearward. The device is configured to attempt to bring the rider platform into steady state balance, accelerating when the platform is tilted a greater degree and decelerating as the rider platform is tilted less.

This produces a vehicle where platform movement can be independent of the position of the vehicle (or vehicle frame). Thus, it is the rider balance, not the vehicle balance, that is used in a feedback loop to control speed.

Multiple axes auto-balance driven vehicles, as taught by the present invention, have several advantages over single axis auto-balance vehicles. One is that they can travel faster (compare a scooter to a Solowheel or Segway). Another is that they can carry heavier loads. Yet another is that they are generally more stable, easier to ride and safer. Thus, there is a need in auto-balance driven devices to provide multiple-axes, yet maintain the beneficial and inherent feel that comes from auto-balance based drive control.

SUMMARY OF THE INVENTION

Accordingly, it is an object of the present invention to provide a transportation device that has two (or more) axis of rotation, one spaced forward of the other, and auto-balance based drive control.

It is another object of the present invention to provide scooter or skateboard like devices that have auto balance based drive control.

It is also an object of the present invention to provide continuous track transportation devices that have auto-balance based drive control.

These and related objects of the present invention are achieved by use of a transportation device having multiple axes of rotation and auto-balance based drive control as described herein.

The attainment of the foregoing and related advantages and features of the invention should be more readily apparent to those skilled in the art, after review of the following more detailed description of the invention taken together with the drawings.

DETAILED DESCRIPTION

Figure 1:
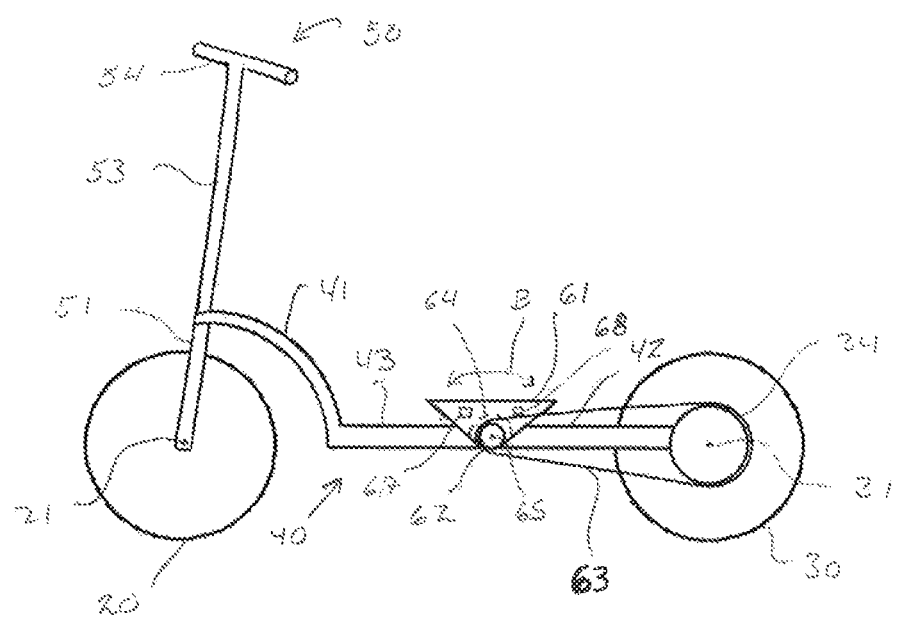
FIG. 1 is a side view of an embodiment of a scooter device having auto-balance based drive control.

Referring to FIG. 1, a side view of a scooter device having auto-balance or "rider-balance" based drive control in accordance with the present invention is shown.

Scooter 10 may include a front wheel 20 and a rear wheel 30, each with an axis of rotation 21,31, respectively. A frame member 40 is preferably coupled between the wheels. In the embodiment of FIG. 1, frame member 40 has a curved section 41 about a portion of front wheel 20 and a flatter or straighter section 42 extending from the curved section to the rear wheel. A handlebar structure 50 may ascend from the front wheel. It may include forks 51 coupled to the front wheel, a steering shaft 53 and a steering handle 54, as known in the art.

A platform structure 60 is preferably mounted on frame 40 and configured for fore-aft rotational movement. Platform structure 60 may include a rider platform 61 disposed towards a top surface thereof. The platform structure is preferably mounted about a pivot axis 65 for fore-aft movement as indicated, for example, by arrow B and may include a drive motor 64 coupled to a drive head 62. The drive head drives a belt or chain 63 which in turn drives a complementary drive wheel assembly 34, which may be a wheel, sprocket, cassette with gears or other (if a cassette, then a gear shift control may be provided at handle 54). Rotation of drive wheel 34 turns rear wheel 30.

Platform structure 60 preferably includes a position sensor 67, which is preferably a gyroscopic sensor, and a control circuit 68. The gyroscopic sensor may detect the fore-aft tilt position of the platform, relative to horizontal, among other measures (side to side, device laid down, etc.). The control circuit drives the drive motor and hence rear wheel 30 based on the fore-aft tilt angle sensed by the position sensor, as known for auto-balancing vehicles such as those disclosed in U.S. Pat. Nos. 8,807,250 and 8,738,278, issued to Chen. Motor 64 may have a drive axis that is collinear with the axis of rotation of the platform, or be otherwise arranged.

A standing space or non-moving platform space 43 may be provided on frame 40 fore or aft of platform structure 60. In FIG. 1, platform 43 is fore of the platform structure, but if belt 63 is covered or the motor/drive otherwise arranged, then the supplemental platform 43 could be behind the platform structure (or both fore and aft). Supplemental platform 43 gives the rider another place to position a foot, to place feet more linearly or to switch positions to rest muscles or to have a more secure position to push off from, etc. It also permits another rider on the device or provides space for cargo, etc. The supplemental platform could be wider than other portions of frame section 42.

It should be noted that platform structure 60 could be split between two sections, a right and a left (for the right and left foot of a rider), which are constructed so that they may rotate past frame member 42 to accommodate riding on steeper uphill or downhill slopes.

It should be noted that the presence of the drive motor under the foot platform, and substantially aligned with the axis of rotation thereof, gives a rider a good tactile feel for balance and drive, and may produce better responsiveness in the drive system than if the motor is otherwise located.

Figure 2:
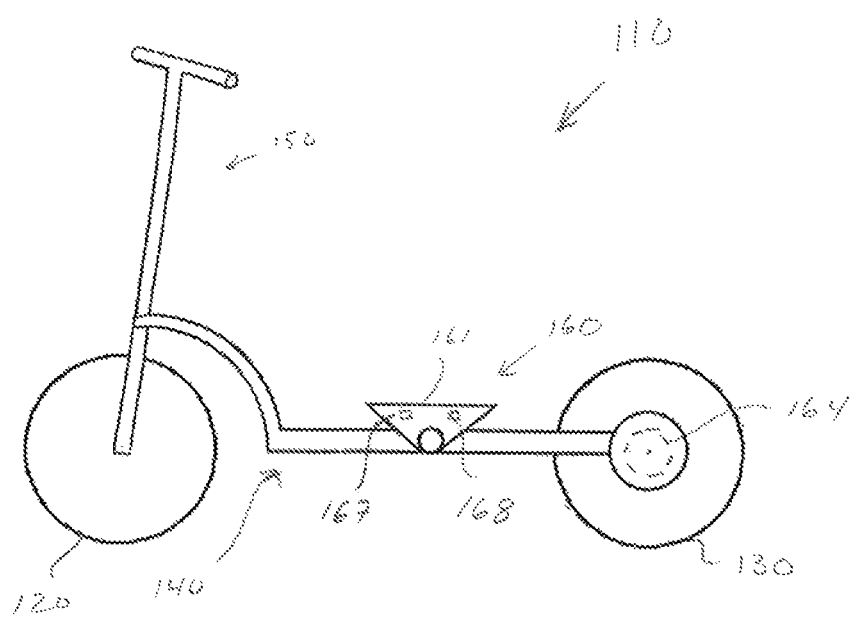
FIG. 2 is a side view of another embodiment of a scooter device having auto-balance based drive control.

Referring to FIG. 2, a side view of another embodiment of a scooter device 110 having rider-balance based drive control in accordance with the present invention is shown.

The device of FIG. 2 is similar to that of FIG. 1, and may include a front and rear wheel 120,130, a frame structure 140, a steering assembly 150 and a platform structure 160 that are the same or similar to the related components in FIG. 1. In contrast to FIG. 1, however, the drive motor 164 is located at the rear wheel and connected electrically to the control circuit 168 which in turn is connected to the gyroscopic sensor 167 located in the platform structure 160.

In this embodiment, rider drive control is input the same way, through fore-aft tilt of the platform 161 by a rider, but the drive motor is located at the rear wheel and may be co-axially arranged with the rear wheel. For example, motor 164 may be a hub motor.

Figure 3:
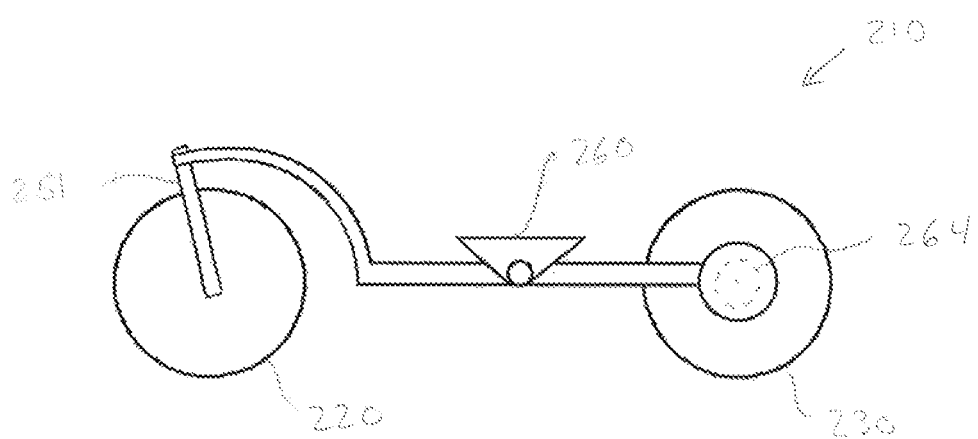
FIG. 3 is a side view of an inline wheeled board having auto-balance based drive control.

Referring to FIG. 3, another embodiment of a transportation device 210 with rider balance based drive control in accordance with the present invention is shown. Device 210 is similar to device 10 of FIG. 1, but instead of an ascending steering structure with a handle, device 210 is configured like an in-line two wheeled board. In the embodiment of FIG. 3, the forks 251 descend rearwardly from the curved frame section 241. This creates a bias-direction wheel assembly and steering is achieved by a rider shifting their weight to the left or right to achieve left or right turning, respectively.

Device 210 includes front and rear wheels 220,230, a platform structure 260 with position sensor 267 and control circuit 268, a drive motor 264 and other components described above with reference to FIGS. 1-2.

Figure 4:
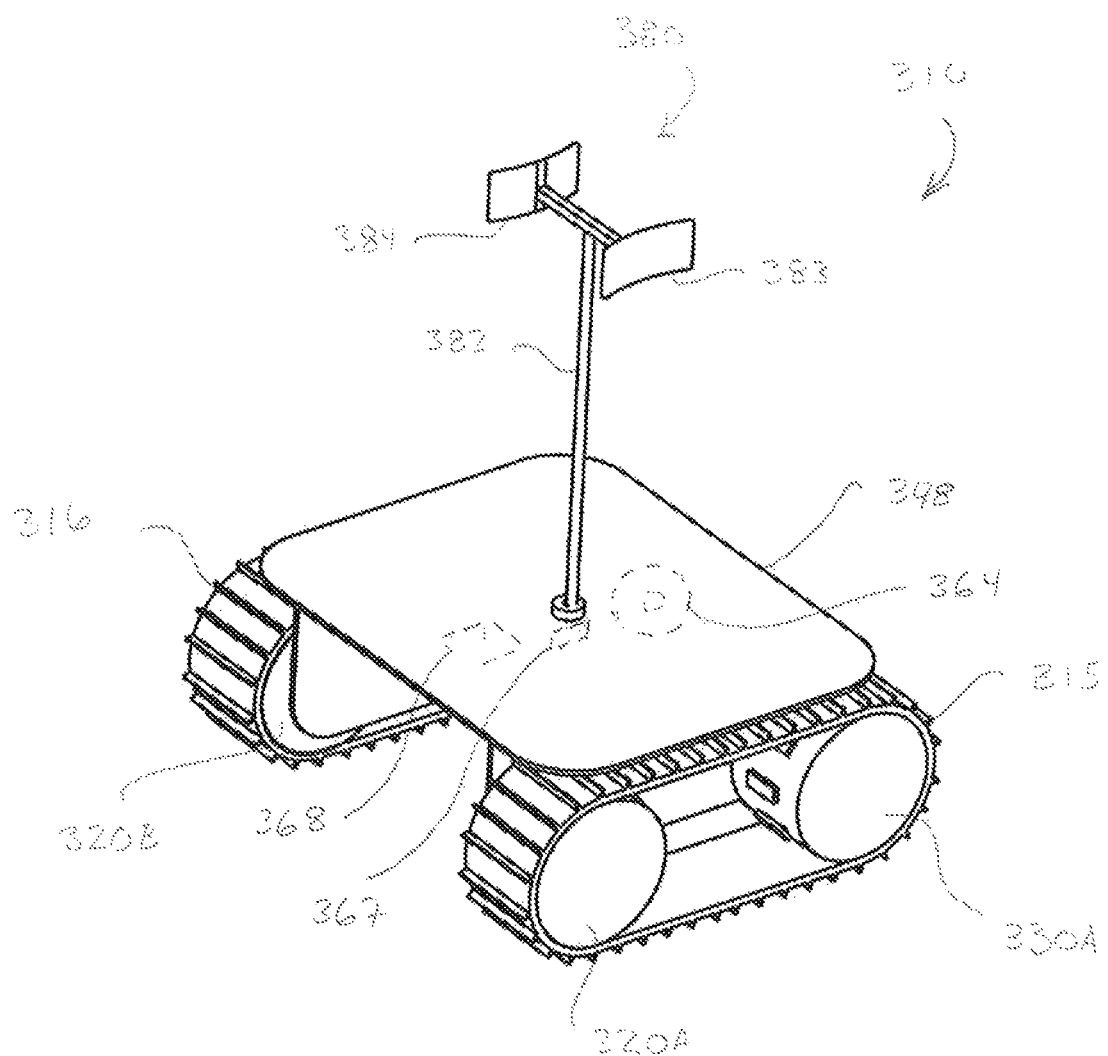
FIG. 4 is a perspective view of an embodiment of a continuous track device having auto-balance based drive control.

Referring to FIG. 4, a perspective view of another embodiment of a transportation device 310 having rider-balance drive control in accordance with the present invention is shown. Device 310 includes paired front wheels 320A,320B and paired rear wheels 330A,330B, each with an axis of rotation 321,331, respectively. The paired wheels are preferably collinear within their pair yet may be otherwise arranged.

The paired wheels are connected by continuous tracks 315,316 (on opposing sides). Wheels 330A,330B are driven by drive motors 364 and in turn drive the tracks (similar to a tank, bulldozer or tractor). There are preferably two drive motors in device 310, one to drive wheel 330A and another to drive wheel 330B. In this manner differential wheel and track driving can be achieved to provide turning. The tracks 315,316 are shown below a rider platform frame 348.

An ascending control structure 380 preferably rises above the platform. The structure may include a shaft 382 and two leg receiving member 383,384 that are preferably configured to receive the lower legs of a user. A position sensor 367 may be coupled at a bottom of shaft 382 (or located on a top of it or otherwise) to detect the position of the ascending structure. Fore-aft tilt angle and side leaning can be detected to control speed and direction, respectively. Sideways lean can be used to drive the tracks at different speeds.

Figure 5:
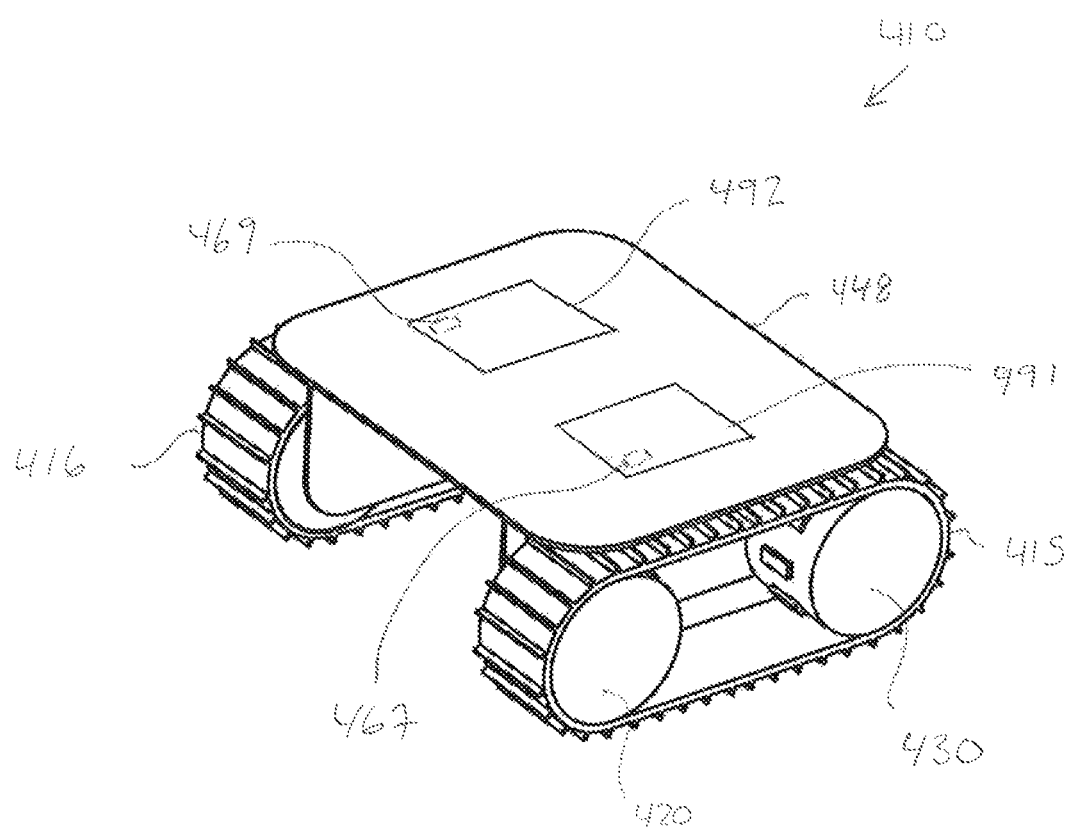
FIG. 5 is a perspective view of an embodiment of a continuous track device having auto-balance based drive control.

Referring to FIG. 5, a perspective view of another embodiment of a transportation device 410 having rider-balance drive control in accordance with the present invention is shown. Device 410 includes paired front wheels 420 and paired rear wheels 430, and continuous tracks 415,416, similar to those described in device 310 of FIG. 4.

Device 410 includes a platform 361 with two movable platform sections 491,492 provided therein. Each of these platform sections includes a gyroscopic position sensor 467,469, respectively. A control circuit and drive motors are provided as discussed elsewhere herein (for example, FIG. 4).

In use, the movable platform sections 491,492 may be tilted forward or backward independently and relative to the platform frame 448. Two drive motors under platform frame 448 are configured to independently drive the rear wheels to achieve independent driving of tracks 415,416, based on the fore-aft tilt angle of the respective foot platform sections—the fore-aft tilt position of the left platform section controlling the left rear wheel and the fore-aft tilt position of the right platform section controlling the right rear wheel.

Suitable batteries and their placement are known in the art, though the battery maybe be placed under the platform and/or coupled to the frame, etc.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. A transportation device, comprising:
   a first rotary device with a first axis of rotation;
   a second rotary device with a second axis of rotation, one rotary device forward of the other, wherein at least one of the first and second rotary devices is driven to achieve locomotion of the device;
   a drive motor, having an axis of rotation, that drives the at least one rotary device driven for locomotion;
   a control member rotatably movable about a control axis, and a position sensor provided with the control member; and
   a control circuit coupled to the position sensor and the drive motor that drives the drive motor based on data from the position sensor;
   wherein the axis of rotation of the drive motor is non-coaxial with the axes of rotation of the first and the second rotary devices; and
   wherein the axis of rotation of the drive motor is coaxial with the control axis of rotation.

2. The device of claim 1, wherein the axis of rotation of the drive motor is parallel to the axis of rotation of the at least one rotary device driven for locomotion.

3. The device of claim 1, wherein the the axis of rotation of the drive motor is parallel to the axes of rotation of the first and second rotary devices.

4. The device of claim 1, wherein the drive motor is mechanically coupled to the at least one rotary device driven for locomotion.

5. The device of claim 4, wherein this mechanical coupling includes a rotary drive device actuated by the drive motor and a continuous mechanical member that is driven by the rotary drive device, the mechanical coupling being configured such that rotational movement of the rotary drive device is translated through the continuous mechanical member to the one of the first and second rotary device driven for locomotion.

6. The device of claim 5,
wherein the mechanical coupling further includes a gear mechanism provided between the rotary drive device and the one of the first and second rotary devices driven for locomotion.

7. The device of claim 6, wherein the continuous mechanical member includes one or more of the group including a belt, a track, and a chain.

8. The device of claim 1, wherein the position sensor senses tilt angle data.

9. The device of claim 1, wherein the control member is rotatably moveable in fore-aft about the control axis.

10. The device of claim 1, wherein the drive motor includes a drive head that has the same axis of rotation as the drive motor and is mechanically coupled, by a mechanical coupling mechanism, to the at least one of the first and second rotary devices to achieve rotation of that rotary device; and
wherein the mechanically coupling mechanism includes a continuous track.

11. A transportation device, comprising:
a first rotary device with a first axis of rotation;
a second rotary device with a second axis of rotation, one rotary device forward of the other, wherein at least one of the first and second rotary devices is driven to achieve locomotion of the device;
a drive motor, having an axis of rotation, that drives the at least one rotary device driven for locomotion;
a rider platform configured for rotatable movement in fore-aft;
a position sensor mounted for movement about a control axis, the position sensor coupled to the rider platform such that movement of the rider platform in fore-aft rotation achieves a predictable and related movement of the position sensor; and
a control circuit coupled to the first position sensor and the drive motor to drive the drive motor based on data from the position sensor;
wherein the axis of rotation of the drive motor is non-coaxial with the axis of rotation of the first rotary device and non-coaxial with the axis of rotation of the second rotary device; and
wherein the axis of rotation of the drive motor is coaxial with the control axis.

12. The device of claim 11, wherein the axis of rotation of the drive motor is parallel to the axes of rotation of the first and second rotary devices.

13. The device of claim 11, wherein the drive motor is mechanically coupled to the at least one rotary device driven for locomotion.

14. The device of claim 13, wherein this mechanical coupling includes a rotary drive device actuated by the drive motor and a continuous mechanical member that is driven by the rotary drive device, the mechanical coupling being configured such that rotational movement of the rotary drive device is translated through the continuous mechanical member to the one of the first and second rotary devices driven for locomotion.

15. The device of claim 14,
wherein this mechanical coupling includes a gear mechanism.

16. The device of claim 11, wherein the position sensor senses fore-aft tilt angle data.

17. The device of claim 11, further comprising a frame coupled between the first and second rotary devices that maintains the relative position of these two devices and supports the control member and drive motor.

18. The device of claim 11, wherein the drive motor includes a drive head that has the same axis of rotation as the drive motor and is mechanically coupled, by a mechanical coupling mechanism, to the at least one of the first and second rotary devices to achieve rotation of that rotary device; and
wherein the mechanically coupling mechanism includes a continuous track.

19. A transportation device, comprising:
a first rotary device with a first axis of rotation;
a second rotary device with a second axis of rotation, one rotary device forward of the other, wherein at least one of the first and second rotary devices is driven to achieve locomotion of the device;
a drive motor, having an axis of rotation, that drives the at least one rotary device driven for locomotion;
a rider platform configured for rotatable movement in fore-aft;
a control member rotatably movable about a control axis and a position sensor provided with the control member, wherein the control member and position sensor are configured such that rotatable movement of the rider platform achieves a predictable and related movement of the position sensor; and
a control circuit coupled to the position sensor and the drive motor to drive the drive motor based on data from the position sensor;
wherein the axis of rotation of the drive motor is non-coaxial with the axes of rotation of the first or the second rotary device; and
wherein the axis of rotation of the drive motor is coaxial with the control axis.

20. A transportation device, comprising:
a first rotary device with a first axis of rotation;
a second rotary device with a second axis of rotation, one rotary device forward of the other;
a drive motor that has an axis of rotation and a rotary drive device that is actuated by the drive motor, wherein at least one of the first and second rotary devices is mechanically coupled to the rotary drive device such that rotation of the rotary drive device achieves rotation of that at least one of the first and second rotary devices;
a control member rotatably movable about a control axis, and a position sensor provided with the control member; and
a control circuit coupled to the position sensor and the drive motor that drives the drive motor based on data from the position sensor;
wherein the axis of rotation of the drive motor is non-coaxial with the axes of rotation of the first and the second rotary devices; and wherein the axis of rotation of the drive motor is coaxial with the control axis of rotation.

21. The device of claim 20, wherein this mechanical coupling includes a continuous mechanical member that is driven by the rotary drive device and coupled to at least one of the first and second rotary devices, and further wherein this mechanical coupling is configured such that rotational movement of the rotary drive device is translated through the continuous mechanical member to the at least one of the first and second rotary devices.

22. The device of claim 21, wherein the coupling of the drive motor through the rotary drive device to the at least one of the first and second rotary devices includes a gear mechanism.

23. A transportation device, comprising:
a first rotary device with a first axis of rotation;
a second rotary device with a second axis of rotation, one rotary device forward of the other, wherein at least one of the first and second rotary devices in driven to achieve locomotion of the device;
a drive motor, having an axis of rotation, that drives the at least one rotary device driven for locomotion;
a control member pivotably movable about a control axis, and a position sensor provided with the control member; and
a control circuit coupled to the position sensor and the drive motor that drives the drive motor based on data from the position sensor;
wherein the axis of rotation of the drive motor is non-coaxial with the axes of rotation of the first and the second rotary devices; and
wherein the axis of rotation of the drive motor is coaxial with the control axis of rotation.

* * * * *